United States Patent Office.

PREPARATION OF PAPER, &c., FOR PHOTOGRAPHIC USE.

WILLIAM GIBSON, OF NEW YORK, N. Y.

Letters Patent No. 60,626, dated December 18, 1866.

*The Schedule referred to in these Letters Patent and making part of the same.*

TO ALL WHOM IT MAY CONCERN:

Be it known that I, WILLIAM GIBSON, of the city, county, and State of New York, have invented a new and useful Improvement in Enameling Paper and other Substances; and I do hereby declare that the following is a full, clear, and exact description thereof, which will enable others skilled in the art to fully understand and make use of the same.

This improvtment is applicable to the surfacing or enameling of all kinds of paper, fibrous, and textile substances and goods, also wood, metal, gutta-percha, India-rubber, glass, porcelain, earthenware, papier mache, pass partout, and compositions made of said substances, and many other materials.

The objects of my improvement are, to provide the above-named substances or materials with a smooth enamel or surface, upon which photographic pictures, engravings, lithographs, and prints of all kinds may be taken or printed with superior results, and also to render such fabrics or substances both fire and water-proof.

I combine with any of the above-named materials or substances a gelatinous or adhesive mixture, filling, coating, or sizing, composed of gelatine, or any animal glue, or albumen, or gluten, or any mixture of any two or more of said substances, and I give a body or thickness to this gelatinous or adhesive mixture by incorporating therewith clay or other aluminus earth, or oxide of zinc, or a mixture of clay and zinc. Any other suitable substance or substances may be employed in lieu of the aluminous earths or zinc, to impart the required body to the adhesive mixture. The gelatinous or adhesive mixture or body may be applied to the substances or articles that are to be enameled by means of a brush or bath, or other suitable device, or may be incorporated with the pulp or raw materials of which said substances are composed during their manufacture. After the adhesive or gelatinous matter or body is dried upon or in the substance to which it has been applied I subject the said substance, or the surfaces thereof, to the action of any suitable astringent solution, which is capable of rendering the gelatinous mixture or body insoluble in water. The astringent mixture or solution which I prefer to employ is composed of gallic acid, boracic acid, alum, or tannin, dissolved in water, but any other astringent, which will produce the above-mentioned effect, may be substituted. The astringent solution is applied by means of a brush or bath, or other suitable device. When any paper, fibrous, or other substance, is treated or prepared with a gelatinous adhesive body or mixture as described, followed by the action of a suitable astringent mixture, the said paper or other substance will be rendered fire and water-proof, and its surface will also be rendered insoluble, so that photographic pictures, engravings, and prints of all kinds may be made or taken thereupon with superior results. When it is desired to apply my improvement to ordinary sheets of paper, I prepare a suitable receptacle or vessel, in which I place the gelatinous mixture or body, and I float the paper upon this mixture, or pass the paper through the mixture, or I apply the mixture to the paper upon one or both sides by means of a brush, or by any other suitable device. The paper is then hung up to dry, and when dried I apply the astringent solution thereto by immersion, or by brush or other device. The paper is then again dried, when it is ready for use; but prior to use, the surface of the paper may, when desired, be highly polished, by being passed between calendering rollers, or any suitable polishing surfaces or plates. The paper may be tinted in various colors, by mixing the desired pigments with the gelatinous matter or body, prior to the application thereof to the paper. After a photographic picture, engraving, lithograph, or other print has been taken or made upon the prepared surface of the paper, any suitable saponaceous mixture may be applied to the printed surface by a brush or other vehicle. The result of the application of the saponaceous mixture is to soften the gelatinous surface, render it more pliable, and improve the general appearance of the picture. The saponaceous mixture may consist of any clean soap dissolved in water, or of oil and silicate of soda. Almost any other clean saponaceous mixture will answer the purpose. In addition to its uses for photographic and printing purposes, the prepared paper may be employed for playing cards, tickets, book covers, neck collars, wristbands, hat linings, sweat bands, and other uses, where an insoluble paper or a hard, pliable, polished, and insoluble surface is required. By a proper modification or tempering of the ingredients of the gelatinous mixture or body and the astringent mixture and the pigments, papers may be produced which resemble porcelain, ivory, leather, and other substances. The gelatinous mixture or body may be applied to or incorporated with the paper pulp in the early stages of the paper manufacture, and the paper webb, before delivery from the paper machine, may be caused to pass in contact with the astringent solution, and subsequently between drying and calendering rollers. The entire preparation of my improved paper may be thus carried on in the paper manufactory, with great economy, and without any essential change in the ordinary paper machinery. My improvement renders the paper to which it is applied not only water-proof, but fire-proof.

In substantially the same manner my improvement may be introduced in the manufacture of cloths and fabrics of all kinds, the gelatinous and astringent mixture being so applied to the cloth or fabric, or to the raw material thereof, that when the cloth or fabric issues from the machine, or from polishing or calendering rolls, one or more of its surfaces will be enameled suitable for the reception of photographic or other printing. Such fabrics or cloths will also, by means of my improvement, be rendered water-proof and fire-proof. The surfaces of painted canvas or other painted fabrics, metals, wood, painted wood, glass, porcelain, earthenware, gutta-percha, rubber, compositions of paper, and varnish, and any other material capable of receiving the adhesive mixture or body, may be enameled and tinted by the successive application to them of the gelatinous body or mixture and the astringent mixture, substantially as before described, and such enameled surfaces will be water-proof, fire-proof, and capable of receiving decorations by the photographic or other processes.

By means of my improvements, I am enabled to produce a new and beautiful composition or substance for photographic decorations, and other purposes of great value. I take a sheet of glass or other hard and finely polished surface, and apply to it one or more layers of the before-mentioned gelatinous mixture or body, until I have cast, built up, or raised a sheet or panel of the said gelatinous mixture of the desired thickness; the addition of plaster of Paris to the adhesive mixture or body will, in some cases, facilitate drying. After the mass is sufficiently dry, it is removed from the glass and subjected to the action of the astringent mixture, by which it is rendered insoluble, and a new and superior plate panel or substance is thus produced. The glass surface is to be greased prior to the application of the adhesive mixture, so as to facilitate the removal of the latter. The quantity or proportion of ingredients used in the mixtures I have described will be varied or governed by the character of the fabric or substance to which they are applied, and also by the character for hardness or softness of the surface which it is desired to produce. Therefore, I do not limit or confine myself to any exact proportion of ingredients.

Having thus described my invention, I claim as new, and desire to secure by Letters Patent—

The production of an insoluble enamel or surface or size in or upon paper, silk, cloth, fibrous and textile articles of all kinds, wood, leather, glass, porcelain, earthenware, metals, India-rubber, gutta-percha, papier mache, pass partout, and compositions, by the successive application thereto of an adhesive mixture or body and an astringent mixture or solution, substantially as described.

The above specification of my invention signed by me this 28th day of October, 1865.

WILLIAM GIBSON.

Witnesses:
M. M. LIVINGSTON,
C. L. E. TOPLEFF.

Assor to Henry M. Johnston & O. S. Follett.